United States Patent [19]

Müller et al.

[11] Patent Number: 4,578,369

[45] Date of Patent: Mar. 25, 1986

[54] PROCESS FOR THE REGENERATION OF FLUORINATION CATALYSTS

[75] Inventors: Thomas Müller, Bad Homburg; Günter Siegemund, Hofheim am Taunus, both of Fed. Rep. of Germany

[73] Assignee: Hoechst Aktiengesellschaft, Fed. Rep. of Germany

[21] Appl. No.: 748,546

[22] Filed: Jun. 25, 1985

[30] Foreign Application Priority Data

Jun. 27, 1984 [DE] Fed. Rep. of Germany ....... 3423625

[51] Int. Cl.4 .......................... B01J 27/32; B01J 27/12; C07C 17/20
[52] U.S. Cl. ......................... 502/36; 502/25; 502/226; 570/169; 570/170
[58] Field of Search ..................... 502/36, 25

[56] References Cited

U.S. PATENT DOCUMENTS 3,660,307  5/1972  Scherer et al. ...................... 502/36

FOREIGN PATENT DOCUMENTS 1194826   6/1965   Fed. Rep. of Germany .
1767200  12/1971   Fed. Rep. of Germany .
2702360   8/1978   Fed. Rep. of Germany .
17146    4/1981   Japan ..................................... 502/36

OTHER PUBLICATIONS

Chem. Abs. 88:79853d (Japanese allowed app. 77-1380-84—publ. appl. 74-56950, copy of Derwent Abstract included).

Primary Examiner—P. E. Konopka
Attorney, Agent, or Firm—Connolly and Hutz

[57] ABSTRACT

According to the specified process chromium oxyfluoride catalysts which have largely lost their activity are regenerated. The catalysts are mixed with magnesium oxide or magnesium hydroxide in the presence of water and converted into a paste. If necessary the mixture must be concentrated by evaporation until it exhibits the consistency of a paste. Finally the paste is dried. The paste is best converted into molded bodies such as, for example, granules before drying.

5 Claims, No Drawings

PROCESS FOR THE REGENERATION OF FLUORINATION CATALYSTS

The invention relates to a process for the regeneration of spent fluorination catalysts of the chromium oxyfluoride group.

Fluorination catalysts of the chromium oxyfluoride group, which are obtained, for example, by fluorination of hydrated oxides of trivalent chromium, such as chromium-III hydroxide or hydrated chromium oxide green (Guignet's green) with hydrogen fluoride or by heating hydrated chromium trifluoride in the presence of a gas containing oxygen such as, for example air, are eminently suitable for the fluorination of chlorinated and/or brominated aliphatic hydrocarbons. The activity of the catalyst has, however, a tendency to decrease if they are in contact with halogen-containing carbon compounds, especially those which also contain hydrogen and/or oxygen, for a rather long time.

Remedying a deactivation of chromium oxyfluoride catalysts by treatment with oxygen at temperatures around 500° C. is already known; however, such a procedure is only effective for a short time (U.S. Pat. No. 2,745,886).

Treating the said catalysts at temperatures of 200° to 500° C. with elementary chlorine to counteract deactivation is also known (West German Pat. No. 1,194,826).

It is further known that hydrogen fluoride can be used for the regeneration of fluorination catalysts of the chromium oxyfluoride group at temperatures of 100°–600° C. This regeneration process cannot prevent a gradual deactivation of the catalysts (West German Pat. No. 1,767,200).

Treatment of the said catalysts with elementary fluorine to reverse a deactivation is further known from the German Offenlegungsschrift DE-OS No. 2,702,360.

Regeneration of spent chromium oxyfluoride catalyst by mixing with 10–50% fresh contact material is also known (Japanese Patent No. 77 138 084). A disadvantage is that in this method it is necessary to use a considerable quantity of active contact material.

The named processes for the regeneration or reactivation of fluorination catalysts of the chromium oxyfluoride group cannot be repeated any number of times, so that after being employed for a more or less long period of time, depending on which halogenated hydrocarbons are being fluorinated, a degree of deactivation of the catalyst results for which it no lnger makes economic sense to carry out the measures described for the regeneration or reactivation, and the impaired catalyst has to be replaced by fresh material. For this reason a considerable quantity of spent inactive chromium oxyfluoride catalyst accumulates in the course of time, whose removal or storage is associated with high economic cost.

The objective was therefore set of finding a process for the regeneration of used, more or less severely deactivated chromium oxyfluoride catalysts.

The subject of the invention is a process for the regeneration of used, inactive fluorination catalysts of the chromium oxyfluoride group, hereinafter termed "old catalyst", wherein the catalysts are mixed with magnesium oxide or magnesium hydroxide in the presence of water, the mixture is converted into a paste (if necessary by evaporation) and the paste dried. The magnesium oxide used must not have been calcined, but must still be able to react with weakly acid compounds. 0.001 to 100 kg MgO, preferably 0.01–1 kg, or 0.00145–145 kg $Mg(OH)_2$, preferably 0.0145–1.45 kg is used per kg old catalyst.

The quantity of water used for the regeneration is not critical; however, the quantity of water should be sufficient for the mass to be processable at least by a kneader. The greater the amount of water used, the greater the amount of water which must be eventually evaporated for obtaining a paste.

To regenerate the spent catalysts by the process according to with the invention the magnesium oxide can be added to the old catalyst in dry form and the resulting dry mixture made up with water and kneaded into a paste.

The old catalyst presented can also be made up with water, the magnesium oxide added dry and the resulting paste kneaded. The kneading is carried out with advantage by means of machines which normally serve in process engineering for mixing paste-like substances (for example vertical kneaders or Duplex kneaders).

For regeneration by the process according to the invention the old catalyst is preferably used in powdered form. It is also possible to use the old catalyst in granulated form.

In the preparation of catalysts according to the invention a paste is obtained which is dried without washing. It is directly suitable for the preparation of molded bodies. It is of advantage that the molded bodies can be prepared using the normal process-engineering methods such as, for example, pelletizing, extruding or granulating. The molded bodies may have any shape, such as cylinders or tablets.

The regenerated catalysts are suitable for use in solid bed, fluid bed or fluid layer reactors.

After molding the drying of the molded catalyst particles is carried out which leads to mechanically robust catalyst bodies. The drying can be carried out both at room temperature and at elevated temperature.

It is convenient to choose a drying temperature of 50° C. to 150° C., preferably 70° C. to 120° C. in order to shorten the drying time. The drying can be carried out both at normal pressure and under vacuum.

Advantageously the catalyst is treated with excess hydrofluoric acid at temperatures of 20°–500° C. before it is used again. In this way excess MgO or $Mg(OH)_2$ is converted into $MgF_2$. Without this treatment the catalyst reaches its maximum activity only during the first catalyzed fluorination in the presence of HF.

It is convenient to carry out the hydrofluoric acid treatment at a temperature at which volatile reaction products (HF, $H_2O$) do not condense. Temperatures of 100°–400° C., preferably 120°–220° C., are advantageous. The quantity of hydrofluoric acid used is not critical. Effective catalysts are obtained if 0.2 to 2 moles of hydrofluoric acid is used per mole of MgO or $Mg(OH)_2$ used.

The quantity of hydrofluoric acid is not subject to an upper limit and is only limited by economic considerations.

The fluorination time can be chosen within wide limits; 0.5 to 10 hours is preferred. To remove the water produced more rapidly and avoid undesirable temperature peaks, HF can be diluted with an inert gas (eg. $N_2$ or air).

Surprisingly, some of the catalysts regenerated by the process according to the invention exhibits a higher activity than freshly prepared chromium oxyfluoride catalyst.

The regenerated catalysts can be used directly for the carrying out of fluorination and/or dismutation reactions with alkyl halides. Activation of the catalysts by calcination is not necessary.

The invention is explained in more detail by means of the examples.

EXAMPLE 1

One part by weight of the used chromium oxyfluoride catalyst of Example 10 is mixed dry with one part by weight of magnesium oxide, made into a paste with 4 parts by weight of water and thoroughly kneaded.

The paste-like product is then granulated into molded cubes (0.5 cm edge length) and dried for 16 hours at 100° C.

0.33 liters (bulk volume) of the dried catalyst bodies (115 g) are treated in a tube made of nickel or vanadium steel with 5 cm clear width and 130 cm length at 280° C. with 211 g hydrofluoric acid, with the HF being diluted with $N_2$. Molar ratio $HF/N_2 = 3.0$; 60 g HF hour.

EXAMPLE 2

Ten parts by weight of used chromium oxyfluoride catalyst are mixed dry with one part by weight of dry magnesium oxide, made into a paste with ten parts by weight of water and thoroughly kneaded. The paste-like product is then granulated into molded cubes (0.5 cm edge length) and dried for 16 hours at 100° C.

0.33 l (bulk volume) of the dried catalyst bodies (210 g) are treated in a tube made of nickel or vanadium steel with a clear width of 5 cm and a length of 130 cm at 210° C. with 120 g hydrofluoric acid, the HF being diluted with $N_2$.

EXAMPLE 3

Thirty parts by weight of used chromium oxyfluoride catalyst are mixed with one part by weight of dry magnesium oxide and made up into a paste with 30 parts by weight of water and thoroughly kneaded.

The paste-like reaction product is then granulated into molded cubes (0.5 cm edge length) and dried for 16 hours at 100° C.

0.33 l (bulk volume) of the dried catalyst bodies (270 g) are treated in a tube made of nickel or vanadium steel with a clear width of 5 cm and a length of 130 cm at 240° C. with 154 g hydrofluoric acid, the HF being diluted with $N_2$.

EXAMPLE 4

One hundred parts by weight of used chromium oxyfluoride catalyst are mixed dry with one part by weight of magnesium oxide, made into a paste with 40 parts by weight of water and thoroughly kneaded.

The paste-like reaction product is then granulated into molded cubes (0.5 cm edge length) and dried at 100° C. for 16 hours.

0.33 l (bulk volume) of the dried catalyst bodies (237 g) are treated in a tube made of nickel or vanadium steel with a clear width of 5 cm and a length of 130 cm at 320° C. with 246 g hydrofluoric acid, the HF being diluted with $N_2$.

EXAMPLE 5

570 g carbon tetrachloride and 120 g hydrofluoric acid are passed in the gaseous state in three hours over 0.33 l of the fluorination catalyst regenerated in accordance with Example 1 which is held by means of an electrical resistance at a temperature of 200° C.

The reactor consists of the same tube which was already used for the hydrofluoric acid treatment in the preparation of the catalyst. The gaseous reaction products leaving the reactor are fed into a washing receptacle in which the acid mixtures to be analyzed are collected.

The levels of the hydrofluoric acid conversion in the examples concerned are determined by means of titration of the wash water. The values obtained are additionally checked potentiometrically by means of a fluoride-specific electrode.

The HF conversion for the fluorination catalyst prepared according to Example 1 is 99.5% referred to the quantity of hydrofluoric acid used.

A chlorine-fluorine exchange test was then carried out at 300° C. for three hours by passing 180 g HF and 285 g $CCl_4$ over this catalyst. Titration of the HCl collected gives in a chlorine-fluorine exchange value of 2.98 i.e. statistically speaking, of 4 chlorine atoms in the $CCl_4$, 2.98 chlorine atoms are exchanged for fluorine atoms.

EXAMPLE 6

The catalyst regenerated according to Example 2 (0.33 l bulk volume) is used in the same experimental arrangement as in Example 5 for the chlorination of carbon tetrachloride with hydrofluoric acid. The reaction temperature is 200° C. Under these circumstances the HF conversion is 99.3%. The chlorine-fluorine exchange value at 300° C. is 2.71.

EXAMPLE 7

The catalyst regenerated according to Example 3 (0.33 l bulk volume) is used in the same experimental arrangement as in Example 5 for the fluorination of carbon tetrachloride with hydrofluoric acid.

The reaction temperature is 200° C. Under these circumstances the HF conversion is 99.4%. The chlorine-fluorine exchange is 2.79.

EXAMPLE 8

The regenerated catalyst according to Example 3 (0.33 l bulk volume) is used in the same experimental arrangement as in Example 5 for the fluorination of carbon tetrachloride with hydrofluoric acid. The reaction temperature is 200° C. Under these circumstances the HF conversion is 99.6%. The chlorine-fluorine exchange value at 300° C. is 2.89.

EXAMPLE 9 (comparative example)

A chromium oxyfluoride catalyst prepared from hydrated chromium oxide green and HF according to Example 2 of the German (Auslegeschrift) DE-AS No. 1,252,182 is used according to the method as in Example 5 for the fluorination of carbon tetrachloride with hydro-fluoric acid.

The reaction temperature is 200° C. Under these circumstances the HF conversion is 99.6%. The chlorine-fluorine exchange value at 300° C. is 2.81.

EXAMPLE 10 (comparative example)

A chromium oxyfluoride catalyst prepared as in Example 9 was used in large-scale industrial fluorocarbon production and moreover was also regenerated as in German Pat. No. 1,194,826 with chlorine. After 20,000 hours it was removed because the activity was too low and used for the fluorination of carbon tetrachloride according to the method of Example 5. The catalyst is identical to the used chromium oxyfluoride catalyst used in Example 1-4.

The HF conversion at 200° C. is 22.5%. The chlorine-fluorine exchange at 300° C. is 2.45.

We claim:

1. Process for the regeneration of spent chromium oxyfluoride fluorination catalysts wherein said process comprises mixing the catalyst with magnesium oxide or magnesium hydroxide in the presence of water, converting the mixture into a paste and drying the paste, whereby the dried paste is suitable for further activation with excess hydrofluoric acid.

2. Process as claimed in claim 1, wherein the paste is shaped before it is dried.

3. Process as claimed in claim 1, wherein 0.001 to 100 kg magnesium oxide or 0.00145 to 145 kg magnesium hydroxide is used per kg of spent catalyst.

4. Process as claimed in claim 1, wherein the dried paste is treated with excess hydrofluoric acid at temperatures of 20°-500° C.

5. Process as claimed in claim 1, wherein the mixture is converted into a paste by evaporation.

* * * * *